US011111416B2

(12) United States Patent
Mullen et al.

(10) Patent No.: US 11,111,416 B2
(45) Date of Patent: Sep. 7, 2021

(54) ANAEROBICALLY CURABLE (METH)ACRYLATE COMPOSITIONS

(71) Applicant: Henkel IP & Holding GmbH, Duesseldorf (DE)

(72) Inventors: David Mullen, County Meath (IE); Lynne Sheerin, County Kildare (IE); Brendan Kneafsey, Lucan (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 117 days.

(21) Appl. No.: 16/148,367

(22) Filed: Oct. 1, 2018

(65) Prior Publication Data

US 2019/0031921 A1    Jan. 31, 2019

Related U.S. Application Data

(63) Continuation of application No. PCT/EP2017/057780, filed on Mar. 31, 2017.

(30) Foreign Application Priority Data

Mar. 31, 2017    (GB) ..................................... 1605618

(51) Int. Cl.

| | | |
|---|---|---|
| *C09J 4/06* | (2006.01) | |
| *C09J 109/00* | (2006.01) | |
| *C09J 133/12* | (2006.01) | |
| *B32B 7/12* | (2006.01) | |
| *B32B 37/12* | (2006.01) | |
| *C09J 5/00* | (2006.01) | |
| *C09J 11/04* | (2006.01) | |
| *C09J 11/08* | (2006.01) | |
| *B32B 15/08* | (2006.01) | |

(52) U.S. Cl.
CPC ........ *C09J 4/06* (2013.01); *B32B 7/12* (2013.01); *B32B 37/12* (2013.01); *C09J 5/00* (2013.01); *C09J 11/04* (2013.01); *C09J 11/08* (2013.01); *C09J 109/00* (2013.01); *C09J 133/12* (2013.01); *B32B 15/08* (2013.01); *C09J 2400/163* (2013.01); *C09J 2409/00* (2013.01); *C09J 2433/00* (2013.01)

(58) Field of Classification Search
CPC ..................... C09J 11/08; C09J 4/06
See application file for complete search history.

(56) References Cited

U.S. PATENT DOCUMENTS

| | | | |
|---|---|---|---|
| 3,218,305 A | 11/1965 | Krieble | |
| 3,425,988 A | 2/1969 | Gorman et al. | |
| 3,625,875 A | 12/1971 | Frauenglass | |
| 4,180,640 A | 12/1979 | Melody et al. | |
| 4,243,791 A | 1/1981 | Hargreaves et al. | |
| 4,287,330 A | 9/1981 | Rich | |
| 4,321,349 A | 3/1982 | Richard | |
| 5,053,315 A * | 10/1991 | West | G03F 7/038 430/278.1 |
| 5,605,999 A | 2/1997 | Chu et al. | |
| 6,632,908 B1 * | 10/2003 | Maandi | C08F 290/062 526/171 |
| 6,852,778 B1 | 2/2005 | Kusuyama | |
| 2003/0217808 A1 | 11/2003 | Woods et al. | |
| 2004/0112507 A1 | 6/2004 | Luong et al. | |
| 2006/0189724 A1 | 8/2006 | Kaneta | |
| 2010/0116435 A1 | 5/2010 | Curet et al. | |
| 2010/0179078 A1 | 7/2010 | Patel et al. | |
| 2012/0180950 A1 | 7/2012 | Attarwala et al. | |
| 2012/0231286 A1 * | 9/2012 | Attarwala | C08F 222/1006 428/522 |
| 2014/0275317 A1 * | 9/2014 | Moussa | C09D 133/08 522/72 |
| 2017/0226256 A1 * | 8/2017 | O'Kane | C08G 59/42 |
| 2018/0237661 A1 * | 8/2018 | Ledwith | C09D 175/16 |

FOREIGN PATENT DOCUMENTS

| | | |
|---|---|---|
| FR | 1581361 | 9/1969 |
| GB | 722264 | 1/1955 |
| GB | 2060669 A | 5/1981 |
| GB | 2283975 A | 5/1995 |

OTHER PUBLICATIONS

Hypro 2000X168LC VTB, Aug. 14, 2013 (Year: 2013).*
Rich, "Anaerobic Adhesives" in Handbook of Adhesive Technology, 29, 467-79, A. Pizzi and K.L. Mittal, eds., Marcel Dekker, Inc., New York (1994).

* cited by examiner

*Primary Examiner* — Liam J Heincer
(74) *Attorney, Agent, or Firm* — Steven C. Bauman (57) ABSTRACT

Anaerobically curable (meth)acrylate compositions, methods for their preparation, and uses thereof. The anaerobically curable compositions proved effective at bonding a wide variety of substrates, and the tensile strength performance of said compositions is excellent.

28 Claims, 6 Drawing Sheets

Figure 6 ns the compositions of the invention have
ANAEROBICALLY CURABLE (METH)ACRYLATE COMPOSITIONS

BACKGROUND

Field

The present invention relates to anaerobically curable compositions, methods of bonding using anaerobically curable compositions, assemblies bonded using anaerobically curable compositions and cure products of anaerobically curable compositions.

Brief Description of Related Technology

Anaerobically curable compositions generally are well known. See e.g. R. D. Rich, "Anaerobic Adhesives" in Handbook of Adhesive Technology, 29, 467-79, A. Pizzi and K. L. Mittal, eds., Marcel Dekker, Inc., New York (1994), and references cited therein. Their uses are legion and new applications continue to be developed.

Anaerobic adhesive systems are those which are stable in the presence of oxygen, but which polymerize in the absence of oxygen. Polymerization is initiated by the presence of free radicals, often generated from peroxy compounds. Anaerobic adhesive compositions are well known for their ability to remain in a liquid, unpolymerized state in the presence of oxygen and to cure to a solid state upon the exclusion of oxygen. As a result of their ability to cure in a substantially oxygen-free environment, anaerobically curable compositions are widely used as adhesives, sealants, and for bonding materials with closely mated surfaces.

Oftentimes anaerobic adhesive systems comprise resin monomers terminated with polymerizable acrylate ester such as methacrylate, ethylacrylate and chloroacrylate esters [e.g., polyethylene glycol dimethacrylate and urethane-acrylates (e.g., U.S. Pat. No. 3,425,988 (Gorman)] derived according to known urethane chemistry. Other ingredients typically present in anaerobically curable adhesive compositions include initiators, such as an organic hydroperoxide for example cumene hydroperoxide, tertiary butyl hydroperoxide and the like, accelerators to increase the rate at which the composition cures, and stabilizers such as quinone or hydroquinone, which are included to help prevent premature polymerization of the adhesive due to decomposition of peroxy compounds.

Desirable cure-inducing compositions to induce and accelerate anaerobic cure may include one or more of saccharin, toluidines, such as N,N-diethyl-p-toluidine ("DE-p-T") and N,N-dimethyl-o-toluidine ("DM-o-T"), and acetyl phenyl hydrazine ("APH") with maleic acid. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and APH are used as standard cure accelerator components in anaerobic adhesive cure systems. Indeed, many of the LOCTITE®-brand anaerobic adhesive products currently available from Henkel Corporation use either saccharin alone or both saccharin and APH.

Anaerobically curable adhesive compositions also commonly include chelators such as ethylenediamine tetraacetic acid ("EDTA") which are employed to sequester metal ions.

For some applications, bonding using an anaerobic composition is troublesome. For example, conventional anaerobically curable compositions are ineffective for bonding some substrates, such as passive ones like plastics and some alloys. For such applications two-part compositions may be formulated. Formulating the compositions as two-part compositions allows a greater degree of freedom in selection of components. For example, it may be possible to place a cure initiator in one part of a two-part composition. When the two parts of the composition are brought together under suitable anaerobic conditions the composition cures.

It is also possible to use an activator for substrates that are difficult to bond utilizing anaerobically curable compositions. Where two substrates are to be bonded together, an activator may be applied to at least one of the substrates. So for example, when bonding two substrates together, where at least one of those substrates is a difficult to bond substrate, an activator may be applied to either substrate, though desirably it is applied to the difficult to bond substrate. Where there is more than one substrate, and for example where there is more than one difficult to bond substrate, it is desirable that the activator is applied to each substrate.

It is desirable to provide alternative systems for bonding and methods of bonding utilizing anaerobically curable compositions.

SUMMARY

In one aspect the present invention provides an anaerobically curable one-part composition comprising:
(a) at least one (meth)acrylate component;
(b) an anaerobic cure inducing component; and
(c) a toughening agent selected from (i) a combination of a styrene butadiene block copolymer and methacrylate functionalized polybutadiene; or (ii) propoxylated bisphenol A fumarate polyester; or combinations of (i) and (ii).

Advantageously, compositions of the present invention have applications in metal-metal bonding and metal-plastic bonding, for example as threadlocking compositions, for securing for example nuts and bolts. The product cures when confined in the absence of air between close fitting surfaces such as close fitting metal surfaces. It protects threads from rust and corrosion and prevents loosening from shock and vibration. Compositions of the invention are storage stable one-part compositions for a period of 12 months at 15-25° C., i.e. the anaerobically curable one-part compositions will not cure until exposed to an anaerobic atmosphere.

The styrene butadiene block copolymer and methacrylate functionalized polybutadiene may be added together, for example mixed together and then added, or independently added. It does not matter in what order they are added to form a composition of the invention, for example whether or not they are added at the same time.

The toughening agent may be a combination of a styrene butadiene block copolymer and methacrylate functionalized polybutadiene, wherein the styrene butadiene block copolymer is present in an amount of about 5 to about 30 wt %, suitably in an amount of about 10 to about 25 wt %, such as about 14 to about 18 wt % based on the total weight of the composition. Advantageously, the presence of the toughening agent ensures the compositions of the invention have excellent tensile strength performance on a variety of substrates. The compositions of the invention are particularly effective at bonding passive substrates, for example bonding passive substrates to metallic substrates.

The toughening agent may be a combination of a styrene butadiene block copolymer and methacrylate functionalized polybutadiene, wherein the methacrylate functionalized polybutadiene is present in an amount of about 5 to about 20 wt %, suitably in an amount of about 8 to about 16 wt %, more suitably from about 10 to about 12 wt % based on the total weight of the composition.

Suitably, when the toughening agent is a combination of a styrene butadiene block copolymer and methacrylate functionalized polybutadiene, the ratio by weight of the methacrylate functionalized polybutadiene to the styrene butadiene block copolymer is from 1:5 to 5:1, suitably the weight ratio of the methacrylate functionalized polybutadiene to the styrene butadiene block copolymer is from 2:3. When the ratio is about 2:3, enhanced tensile strength performance was observed, particularly for bonding polymethyl methacrylate, polyvinyl chloride and polyamide substrates to steel substrates. Furthermore, when the ratio is about 2:3, the compositions of the invention proved particularly effective at bonding aluminium substrates.

The methacrylate functionalized polybutadiene may be selected from the group consisting of methacrylate (vinyl) terminated polybutadiene and butadiene-acrylonitrile polymer.

Suitably, the methacrylate functionalized polybutadiene has a number average molecular weight of from about 3,000 to about 5,500. Optionally, the methacrylate functionalized polybutadiene has a number average molecular weight of about 4,500.

Suitably, the methacrylate functionalized polybutadiene is methacrylate (vinyl) terminated polybutadiene. It may have a number average molecular weight of from about 3,000 to about 5,500, for example the number average molecular weight may be about 4,500, such as about 4,450. Advantageously, compositions of the invention comprising methacrylate (vinyl) terminated polybutadiene with a number average molecular weight of about 4,500 proved particularly effective at bonding a wide variety of substrates, particularly bonding passive substrates to metallic substrates.

Suitably, a propoxylated bisphenol A fumarate polyester may be formed through reaction of propylene oxide and bisphenol A, and subsequent reaction with fumaric acid to provide an unsaturated polyester. The synthesis of such unsaturated polyesters has been described in inter alia U.S. Pat. No. 5,053,315 and Great Britain Patent Document No. GB 722264 the contents of each of which is hereby incorporated by reference in its entirety. The propoxylated bisphenol A fumarate polyester may be present in an amount of about 15 to about 45 wt %, suitably in an amount of about 20 to about 35 wt %, suitably in an amount of about 27 to about 33 wt %, based on the total weight of the composition. Suitably the propoxylated bisphenol A fumarate polyester has a number average molecular weight of from about 2,500 to about 3,000. Advantageously, compositions of the invention comprising propoxylated bisphenol A fumarate polyester proved particularly effective at bonding steel and aluminium substrates to polycarbonate substrates and to acrylonitrile butadiene styrene.

Suitably, the anaerobically curable composition of the invention further comprises a transition metal.

The transition metal may be selected from copper, iron, vanadium, cobalt, chromium, silver and manganese, or combinations thereof.

Suitably, the transition metal is in salt form. Optionally the salt is selected from cobalt (II) naphthenate, copper carbonate, copper (II) acetylacetonate, silver nitrate, vanadium nitrate, vanadium (III) acetylacetonate and combinations thereof.

Another aspect of the present invention provides for use of an anaerobically curable one-part composition comprising:
(a) at least one (meth)acrylate component;
(b) an anaerobic cure inducing component; and
(c) a toughening agent selected from (i) a combination of a styrene butadiene block copolymer and methacrylate functionalized polybutadiene; or (ii) propoxylated bisphenol A fumarate polyester, for bonding a first substrate to a second substrate.

Suitably, the first substrate may be a passive substrate, for example a plastic substrate.

The plastic substrate may optionally be selected from: acrylonitrile butadiene styrene ("ABS"), polycarbonate ("PC"), polycarbonate/acrylonitrile butadiene styrene ("PCABS"), polyarylamides, polyamides such as nylon, including nylon 6'6 (("Ny"), (poly[imino(1,6-dioxohexamethylene) iminohexamethylene])), acrylic plastic, polyvinyl chloride ("PVC") and polymethyl methacrylate ("PMMA").

The second substrate may be metallic. For example, the second substrate may be steel, including mild steel and stainless steel, brass including clock brass, bronze, or zinc, aluminium, iron, copper, beryllium, cobalt, manganese, nickel, cadmium, gold, silver or alloys thereof. Suitably, the second substrate may be an active substrate, containing trace amounts of a transition metal.

The compositions of the invention proved particularly effective at bonding PMMA to each of mild steel, stainless steel and aluminium substrates. Advantageously, said compositions also demonstrated excellent tensile strengths for PVC bonding to each of mild steel, stainless steel and aluminium. Similarly, excellent tensile strengths were observed when the compositions of the invention were employed to bond polyamide 6'6 (i.e. nylon 6'6) substrates to each of mild steel, stainless steel and aluminium.

Compositions comprising propoxylated bisphenol A fumarate polyester in addition to compositions comprising a combination of a styrene butadiene block copolymer and methacrylate functionalized polybutadiene, proved particularly effective at bonding polycarbonate substrates to each of stainless steel and aluminium substrates.

A further aspect of the present invention provides a method of bonding together two substrates comprising the steps of:
applying an anaerobically curable one-part composition comprising:
(a) at least one (meth)acrylate component;
(b) an anaerobic cure inducing component; and
(c) a toughening agent selected from (i) a combination of a styrene butadiene block copolymer and methacrylate functionalized polybutadiene; or (ii) propoxylated bisphenol A fumarate polyester, to at least one of the substrates and mating together the substrates for a time sufficient to permit an adhesive bond to form from the (meth)acrylate composition between the mated substrates.

Advantageously, this method proved particularly effective at bonding a wide variety of substrates, for example bonding passive substrates such as plastic substrates to metallic substrates.

A still further aspect of the present invention provides an assembly comprising two substrates bonded together by the cure product of an anaerobically curable one-part composition comprising:
(a) at least one (meth)acrylate component;
(b) an anaerobic cure inducing component; and
(c) a toughening agent selected from (i) a combination of a styrene butadiene block copolymer and methacrylate functionalized polybutadiene; or (ii) propoxylated bisphenol A fumarate polyester.

Another aspect of the present invention provides a method of anaerobically curing a (meth)acrylate composition comprising the steps of:

providing a one-part (meth)acrylate composition comprising:
(a) a (meth)acrylate component;
(b) a cure inducing component; and
(c) a toughening agent selected from (i) a combination of a styrene butadiene block copolymer and methacrylate functionalized polybutadiene; or (ii) propoxylated bisphenol A fumarate polyester; and exposing the (meth)acrylate composition to an anaerobic environment for a time sufficient to cure the composition.

Furthermore, the present invention also provides a process for preparing a reaction product from a curable composition, comprising the steps of:
applying an activator composition to desired substrate surface;
applying to that surface a one-part composition comprising:
(a) a (meth)acrylate component;
(b) a cure inducing component; and
(c) a toughening agent selected from (i) a combination of a styrene butadiene block copolymer and methacrylate functionalized polybutadiene; or (ii) propoxylated bisphenol A fumarate polyester;
mating a second surface to that substrate surface to form an assembly; and
exposing the (meth)acrylate composition to an anaerobic environment for a time sufficient to cure the composition.

BRIEF DESCRIPTION OF THE DRAWINGS

Embodiments of the invention will be described, by way of example only, with reference to the accompanying drawings.

DETAILED DESCRIPTION

The (meth)acrylate component may be a (meth)acrylate monomer having the formula: $H_2C\!=\!CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

Additional (meth)acrylate monomers suitable for use herein include polyfunctional (meth)acrylate monomers, such as, but not limited to, di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

For example the anaerobically curable component may include Bisphenol A dimethacrylate:

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Other suitable monomers include polyacrylate esters represented by the formula where $R^4$ is a radical selected from hydrogen, halogen or alkyl of from 1 to about 4 carbon atoms; q is an integer equal to at least 1, and suitably equal to from 1 to about 4; and X is an organic radical containing at least two carbon atoms and having a total bonding capacity of q plus 1. With regard to the upper limit for the number of carbon atoms in X, workable monomers exist at essentially any value. As a practical matter, however, a general upper limit is about 50 carbon atoms, such as desirably about 30, and desirably about 20.

For example, X can be an organic radical of the formula:

where each of $Y^1$ and $Y^2$ is an organic radical, such as a hydrocarbon group, containing at least 2 carbon atoms, and desirably from 2 to about 10 carbon atoms, and Z is an organic radical, suitably a hydrocarbon group, containing at least 1 carbon atom, and suitably from 2 to about 10 carbon atoms. Other classes of useful monomers are the reaction products of di- or tri-alkylolamines (e.g., ethanolamines or propanolamines) with acrylic acids, such as are disclosed in French Pat. No. 1,581,361.

Oligomers with (meth)acrylate functionality may also be used. Examples of useful (meth)acrylate-functionalized oligomers include those having the following general formula:

where $R^5$ represents a radical selected from hydrogen, alkyl of from 1 to about 4 carbon atoms, hydroxy alkyl of from 1 to about 4 carbon atoms, or where $R^4$ is a radical selected from hydrogen, halogen, or alkyl of from 1 to about 4 carbon atoms; $R^6$ is a radical selected from hydrogen, hydroxyl, or m is an integer equal to at least 1, e.g., from 1 to about 15 or higher, and desirably from 1 to about 8; n is an integer equal to at least 1, e.g., 1 to about 40 or more, and desirably between about 2 and about 10; and p is 0 or 1.

Typical examples of acrylic ester oligomers corresponding to the above general formula include di-, tri- and tetraethyleneglycol dimethacrylate; di(pentamethyleneglycol)dimethacrylate; tetraethyleneglycol diacrylate; tetraethyleneglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters, and particularly the polyacrylate esters described in the preceding paragraphs, can be desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most suitably, the polar group is selected from labile hydrogen, heterocyclic ring, hydroxy, amino, cyano, and halo polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Another useful class of materials are the reaction product of (meth)acrylate-functionalized, hydroxyl- or amino-containing materials and polyisocyanate in suitable proportions so as to convert all of the isocyanate groups to urethane or ureido groups, respectively.

The so-formed (meth)acrylate urethane or urea esters may contain hydroxy or amino functional groups on the non-acrylate portion thereof. (Meth)acrylate esters suitable for use have the formula:

where X is selected from —O— and where $R^9$ is selected from hydrogen or lower alkyl of 1 through 7 carbon atoms; $R^7$ is selected from hydrogen, halogen (such as chlorine) or alkyl (such as methyl and ethyl radicals); and $R^{8a}$ is a divalent organic radical selected from alkylene of 1 through 8 carbon atoms, phenylene and naphthylene.

These groups upon proper reaction with a polyisocyanate, yield a monomer of the following general formula:

where n is an integer from 2 to about 6; B is a polyvalent organic radical selected from alkyl, alkenyl, cycloalkyl, cycloalkenyl, aryl, alkaryl, alkaryl and heterocyclic radicals both substituted and unsubstituted, and combinations thereof; and $R^7$, $R^{8a}$ and X have the meanings given above.

Depending on the nature of B, these (meth)acrylate esters with urea or urethane linkages may have molecular weights placing them in the oligomer class (such as about 1,000 up to about 5,000) or in the polymer class (such as about greater than 5,000).

Of course, combinations of these (meth)acrylate monomers may also be used.

The (meth)acrylate component should comprise from about 50 to about 75 such as from about 50 to about 70 percent by weight of the composition, such as about 55 to 65 percent by weight, such as 55 to about 57 percent by weight, based on the total weight of the composition.

The styrene butadiene block copolymer may be a linear block copolymer based on styrene and butadiene. The skilled person will appreciate that the styrene butadiene block copolymer is also known as polystyrene-block-polybutadiene-block-polystyrene. Polystyrene may account for about 35 percent by weight to about 45 percent by weight of the co-polymer, optionally the copolymer may contain about 40 percent by weight.

For example the styrene butadiene block copolymer may be of the formula:

$[CH_2CH(C_6H_5)]_x$ $(CH_2CH{=}CHCH_2)_y$ $[CH_2CH(C_6H_5)]_x$ where x, y and z are integers.

The methacrylate functionalized polybutadiene may be methacrylate (vinyl) terminated butadiene ("VTB") polymer and/or butadiene acrylonitrile ("VTBNX") polymer. Suitable methacrylate functionalized polybutadiene polymers are available under the trade name Hypro™, for example Hypro 2000X168LC which is a methacrylate (vinyl) terminated polybutadiene, or Hypro 1300X33LCVTBNX which is a butadiene-acrylonitrile polymer, or Hypro 1300X43LC VTBNX which is also a butadiene-acrylonitrile polymer.

The methacrylate functionalized polybutadiene may have a number average molecular weight of from about 3,000 to about 5,500. The methacrylate functionalized polybutadiene may be methacrylate (vinyl) terminated polybutadiene having a number average molecular weight of about 4,200 to about 4,800, for example the number average molecular weight may be about 4,450. The methacrylate functionalized polybutadiene may be butadiene-acrylonitrile polymer having a number average molecular weight of about 3,500 to about 4,000, for example the number average molecular weight may be about 3,700 or about 3,900. Advantageously, compositions of the invention comprising methacrylate (vinyl) terminated polybutadiene and/or butadiene acrylonitrile ("VTBNX") polymer proved particularly effective at bonding a wide variety of substrates, particularly bonding passive substrates to metallic substrates.

The propoxylated bisphenol A fumarate polyester may be is FILCO 663 P, other sources include those available under the tradenames ATLAC 382 and DION 382E.

Suitably the propoxylated bisphenol A fumarate polyester has a number average molecular weight of from about 2,500 to about 3,000. Advantageously, compositions of the invention comprising propoxylated bisphenol A fumarate polyester proved particularly effective at bonding steel substrates.

The inventive compositions may also comprise a transition metal. The transition metal may be present in the form of a salt. The transition metal may be any transition metal selected from Groups 3 to 12 of the Periodic Table of Elements and combinations thereof. For example a salt of any transition metal selected from Groups 3 to 12 of the Periodic Table of Elements, and combinations of those salts, may be used. In all cases however it will be appreciated that the transition metal is redox active. Being redox active allows it to participate in the activation of (anaerobic cure of) the anaerobic composition.

The transition metal may be titanium, chromium, manganese, iron, cobalt, nickel, copper, zinc, silver, vanadium, molybdenum, ruthenium, and combinations thereof.

Desirably the transition metal may be copper, iron, vanadium, cobalt and chromium, and combinations thereof.

Desirably the transition metal is provided in the form of a salt. Suitable salts include the following salts and any combination thereof.

Titanium salts include: titanium(IV) bromide; titanium carbonitride powder, Ti2CN; titanium(II) chloride; titanium (III) chloride; titanium(IV) chloride; titanium(III) chloride-aluminum chloride; titanium(III) fluoride; titanium(IV) fluoride; titanium(IV) iodide; titanium(IV) oxysulfate solution.

Chromium salts include: chromium(II) chloride; chromium(III) bromide; chromium(III) chloride; chromium(III) chloride tetrahydrofuran complex; chromium(III) fluoride; chromium(III) nitrate; chromium(III) perchlorate; chromium(III) phosphate; chromium(III) sulfate; chromyl chloride; $CrO_2$; potassium chromium(III) oxalate.

Manganese salts include: manganese(II) bromide; manganese(II) carbonate; manganese(II) chloride; manganese (II) cyclohexanebutyrate; manganese(II) fluoride; manganese(III) fluoride; manganese(II) formate; manganese(II) iodide; manganese(II) molybdate; manganese(II) nitrate; manganese(II) perchlorate; and manganese(II) sulfate.

Iron salts include: ammonium iron(II) sulfate; iron(II) bromide; iron(III) bromide; iron(II) chloride; iron(III) chloride; iron(III) citrate; iron(II) fluoride; iron(III) fluoride; iron(II) iodide; iron(II) molybdate; iron(III) nitrate; iron(II) oxalate; iron(III) oxalate; iron(II) perchlorate; iron(III) phosphate; iron(III) pyrophosphate; iron(II) sulfate; iron(III) sulfate; iron(II) tetrafluoroborate; and potassium hexacyanoferrate(II).

Cobalt salts include: cobalt (II) naphthenate; Ammonium cobalt(II) sulfate; cobalt(II) benzoylacetonate; cobalt(II) bromide; cobalt(II) carbonate; cobalt(II) chloride; cobalt(II) cyanide; cobalt(II) fluoride; cobalt(III) fluoride; cobalt(II) hydroxide; cobalt(II) iodide; cobalt(II) nitrate; cobalt(II) oxalate; cobalt(II) perchlorate; cobalt(II) phosphate; cobalt (II) sulfate; cobalt(II) tetrafluoroborate; cobalt(II) thiocyanate; cobalt(II) thiocyanate; trans-dichlorobis(ethylenediamine)cobalt(III) chloride; Hexaamminecobalt(III) chloride; and pentaamminechlorocobalt(III) chloride.

Nickel salts include: ammonium nickel(II) sulfate; bis (ethylenediamine)nickel(II) chloride; nickel(II) acetate; nickel(II) bromide; nickel(II) bromide ethylene glycol dimethyl ether complex; nickel(II) bromide 2-methoxyethyl ether complex; nickel carbonate, nickel(II) carbonate hydroxide; nickel (II) chloride; nickel(II) cyclohexanebutyrate; nickel (II) fluoride; nickel (II) hexafluorosilicate; nickel(II) hydroxide; nickel(II) iodide; nickel (II) nitrate; nickel(II) oxalate; nickel(II) perchlorate; nickel(II) sulfamate; nickel(II) sulfate; potassium nickel(IV) paraperiodate; and potassium tetracyanonickelate (II).

Copper salts include: copper acetate, copper hexanoate, copper-2-ethylhexanoate copper carbonate; copper (II) acetylacetonate; copper(I) bromide; copper(II) bromide; copper(I) bromide dimethyl sulfide complex; copper(I) chloride; copper(II) chloride; copper(I) cyanide; copper(II) cyclohexanebutyrate; copper(II) fluoride; copper(II) formate; copper(II) D-gluconate; copper(II) hydroxide; copper (II) hydroxide phosphate; copper(I) iodide; copper(II) molybdate; copper(II) nitrate; copper(II) perchlorate; copper (II) pyrophosphate; copper(II) selenite; copper(II) sulfate;

copper(II) tartrate; copper(II) tetrafluoroborate; copper(I) thiocyanate; tetraamminecopper(II) sulfate.

Zinc salts include: zinc bromide; zinc chloride; zinc citrate; zinc cyanide; zinc fluoride; zinc hexafluorosilicate; zinc iodide; zinc methacrylate; zinc molybdate; zinc nitrate; zinc oxalate; zinc perchlorate; zinc phosphate; zinc selenite; zinc sulfate; zinc tetrafluoroborate; zinc p-toluenesulfonate.

Silver salts include: silver bromate; silver carbonate; silver chlorate; silver chloride; silver chromate; silver citrate; silver cyanate; silver cyanide; silver cyclohexanebutyrate; silver(I) fluoride; silver(II) fluoride; silver heptafluorobutyrate; silver hexafluoroantimonate; silver hexafluoroarsenate(V); silver hexafluorophosphate; silver(I) hydrogenfluoride; silver iodide; silver lactate; silver metavanadate; silver molybdate; silver nitrate; silver nitrite; silver pentafluoropropionate; silver perchlorate; silver(I) perrhenate; silver phosphate; silver(I) sulfadiazine; silver sulfate; silver tetrafluoroborate; silver thiocyanate; silver p-toluenesulfonate.

Vanadium salts include: vanadium (III) acetylacetonate; vanadium(II) chloride; vanadium(III) chloride; vanadium (IV) chloride; vanadium(III) chloride tetrahydrofuran complex; vanadium(V) oxychloride; vanadium(V) oxyfluoride.

Molybdenum salts include: Molybdenum (III) chloride; Molybdenum (V) chloride; Molybdenum (VI) dichloride dioxide.

Ruthenium salts include: chloropentaammineruthenium (II) chloride; hexaammineruthenium (II) chloride; hexaammineruthenium (III) chloride; pentaamminechlororuthenium (III) chloride; ruthenium (III) chloride; ruthenium iodide; ruthenium(III) nitrosyl chloride; ruthenium (III) nitrosyl nitrate.

The transition metal salt may be selected from cobalt (II) naphthenate; copper carbonate; copper (II) acetylacetonate; silver nitrate; vanadium (III) acetylacetonate and combinations thereof.

The inventive compositions may also include other conventional components, such as free radical initiators, free radical accelerators, inhibitors of free radical generation, as well as metal catalysts, such as iron and copper.

A number of well-known initiators of free radical polymerization may be incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

If desired the initiator component may be encapsulated. For example the initiator component may be an encapsulated peroxide, for example encapsulated benzoyl peroxide.

Free radical accelerators may optionally be included in the compositions of the invention: suitable accelerators include 1-acetyl-2-phenylhydrazine ("APH"), Dimethyl-para-Toluidine ("DMpT"), Diethyl-para-Toluidine ("DEpT") with Dimethyl-ortho-Toluidine ("DMoT"), succinylphenylhydrazine, tetrahydroquinoline, p-toluenesulphonylhydrazine, and dihydroxyethyl-para-toluidine and combinations thereof.

Suitably, the free radical accelerator may be present in an amount of from about 0.1 to 1.0 percent by weight, based on the total weight of the composition, with about 0.5 to about 0.8 percent by weight being desirable.

Inhibitors of free radical generation may optionally be included in the compositions of the invention: suitable inhibitors include benzoquinone, naphthoquinone, phenothiazine and hydroquinone and combinations thereof. Suitably, the inhibitors of free radical generation may be present in an amount of from about 0.02 to about 0.09 percent by weight, based on the total weight of the composition, with about 0.03 to about 0.05 percent by weight being desirable.

Metal chelators may optionally be included in the compositions of the invention; suitable chelators include tetrasodium salt of ethylene diamine tetra-acetic acid ("EDTA") or etidronic acid and combinations thereof. Suitably, the metal chelators may be present in an amount of from about 0.01 to about 0.07 percent by weight, based on the total weight of the composition, with about 0.025 to about 0.040 percent by weight being desirable, such as about 0.035 percent by weight based on the total weight of the composition.

The compositions of the invention may optionally include a carboxylate component. The carboxylate component is a component comprising a carboxylic acid group or an ester group. Without being bound by theory, the carboxylate component may act as an accelerator and an adhesion promoter. Suitable carboxylate groups include methacrylic acid, acrylic acid, hydroxyethyl methacrylate ("HEMA") succinate ("HEMA succinate"), hydroxyethyl methacrylate maleate ("HEMA maleate"), hydroxyethyl methacrylate phosphate ("HEMA phosphate"), or maleic acid and combinations thereof.

Suitably, the carboxylate component is a carboxylic acid and is present in an amount of from about 6 to about 12 percent by weight based on the total weight of the composition, such as about 9 to about 11 percent by weight based on the total weight of the composition.

Suitably, the carboxylate component may be methacrylic acid and is present in an amount of from about 6 to about 12 percent by weight, based on the total weight of the composition, with about 9.0 to about 11.0 percent by weight being desirable.

Compositions used in the present invention may further comprise thickeners and/or fillers.

As mentioned above, it will be appreciated that the composition used in the invention can include non-reactive species including resins. Such components do not participate in an anaerobic cure reaction. They are unreactive. Such components may however become part of the cure product having been incorporated therein during the curing of other components. Examples of such non-reactive species include: fumed silica, polyethylene, PTFE, mica, polyamide wax, titanium dioxide, barium sulphate.

The present invention also provides methods of bonding using the anaerobic adhesive compositions, as well as the reaction products of the compositions.

The anaerobically curable compositions for use in the present invention may be prepared using conventional methods which are well known to those persons of skill in the art. For instance, the components of the composition may be mixed together in any convenient order consistent with the roles and functions the components are to perform in the compositions. Conventional mixing techniques using known apparatus may be employed.

Conventional stabilizers and inhibitors (such as phenols including hydroquinone and quinones) may be employed to control and prevent premature peroxide decomposition and polymerization of the composition of the present invention.

Conventional anaerobic cure-inducing compositions to induce and accelerate anaerobic cure may be included. For example compositions of the present invention may include one or more of saccharin, toluidines, such as N,N-diethyl-p-toluidine ("DE-p-T") and N,N-dimethyl-o-toluidine ("DM-o-T"), and acetyl phenylhydrazine ("APH"). Suitably, the compositions of the present invention include saccharin and acetyl phenylhydrazine.

Compositions of the present invention may further comprise thickeners and/or fillers.

Suitably, the present invention provides an anaerobically curable one-part composition, comprising:
(a) at least one (meth)acrylate component present in an amount of from about 55 wt % to about 65 wt % based on the total weight of the composition;
(b) an anaerobic cure inducing component; and
(c) a toughening agent comprising a combination of a styrene butadiene block copolymer present in an amount of from about 10 wt % to about 25 wt % based on the total weight of the composition and a methacrylate functionalised polybutadiene present in an amount of from about 8 wt % to about 16 wt % based on the total weight of the composition, and wherein polystyrene represents about 35 wt % to about 45 wt % of the overall weight of the styrene butadiene block copolymer.

The anaerobically curable one-part composition, optionally comprises inhibitors of free radical generation present in an amount of from about 0.02 to about 0.09 wt % based on the total weight of the composition. Suitably, the anaerobically curable composition comprises a metal chelator, such as ethylene diamine tetraacetic acid (EDTA), in an amount of from about 0.025 to about 0.040 wt % based on the total weight of the composition. Suitably, the anaerobically curable composition comprises a carboxylic acid present in an amount of from about 6 to about 12 wt % based on the total weight of the composition.

The compositions of the invention advantageously provide enhanced physical properties when cured in the presence of passive and active substrates.

All percentages by weight are based on the total weight of the composition unless otherwise indicated.

EXAMPLES

The components of a representative composition according to the invention are listed in Table 1:

TABLE 1

| Material | Amt/% wt |
|---|---|
| Methyl methacrylate (MMA) | 50-70 |
| Methacrylate functionalised polybutadiene | 8-16 |
| Styrene butadiene block copolymer | 14-18 |
| Free radical inhibitor (e.g. Naphthoquinone 5 wt % in polyethylene glycol methacrylate (PEGMA)) | 0.02-0.09 |
| Metal chelator (EDTA 3.5 wt % in propylene glycol (PEG)) | 0.01-0.07 |
| Methacrylic acid | 6.0-12.0 |
| 1-acetyl-2-phenylhydrazine | 0.5-1.0 |

TABLE 1-continued

| Material | Amt/% wt |
|---|---|
| Saccharin | 1.0-2.0 |
| Cumene hydroperoxide | 1.0-2.0 |

The composition of Table 1 may optionally be used with an activator composition to bond a first substrate to a second substrate. A representative activator composition is provided in Table 2:

TABLE 2

| Material | Amt/% wt |
|---|---|
| heptane | 53-55 |
| isopropyl alcohol | 14-17 |
| dihidropyridine | 20-40 |
| Cupric (II) acetylacetonate | 0.001-0.02 |

The anaerobic composition is prepared by mixing the materials in Table 1 at room temperature (MMA is volatile at elevated temperatures).

A suitable activator can be prepared by mixing the materials in Table 2 at room temperature. Alternatively, a suitable commercially available activator may be used. For example, LOCTITE® 7387™ Depend® Activator is a suitable activator.

Tensile strength was assessed for various substrates using various compositions within the ranges set forth in Table 1. The following methodology was employed unless otherwise indicated.

An activator is applied to one side of a first passive adherend (metal or plastic lapshear) by either a brush or using a pipette and the entrained solvent is allowed to evaporate. The anaerobically curable composition of the invention or a comparative anaerobically curable composition is applied as a coating to a second lapshear adherend (for example a metallic substrate) and an assembly is prepared by clamping the first lapshear to the second lapshear with the activator and the specified anaerobically curable composition sandwiched between said first and second adherends. The clamped assembly is allowed to cure for a period of 24 hours, and the tensile break force is determined on an Instron, according to ASTM D1002-05.

Example 1

| Material | Composition/Amt (% wt) | |
|---|---|---|
|  | A | B |
| Methyl methacrylate (MMA) | 56.73 | 62.97 |
| Methacrylate functionalised polybutadiene (HYPRO 2000X168LC) | 11.12 | 0 |
| Styrene butadiene block copolymer (KRATON D1155E) | 16.69 | 0 |
| Naphthoquinone 5 wt % in PEGMA | 0.21 | 0.20 |
| EDTA 3.5 wt % in PEG | 0.93 | 0.99 |
| Methacrylic acid | 10.00 | 0 |
| Acrylic acid | 0 | 4.16 |
| 1-acetyl-2-phenylhydrazine | 0.77 | 0.75 |
| Saccharin | 1.70 | 1.00 |
| Propoxylated bisphenol A fumarate polyester (FILCO 663 P) | 0 | 28.93 |
| Cumene hydroperoxide | 1.85 | 1.00 |

The methacrylate functionalized polybutadiene employed in Example 1 is methacrylate (vinyl) terminated butadiene (VTB) polymer having a number average molecular weight of about 4,450. Such a VTB polymer is available from Emerald Performance Materials® under the tradename Hypro™ 2000X168LC.

A suitable styrene butadiene block copolymer is available from Kraton Performance Polymers under the trade name Kraton® D1155 E polymer. Kraton® D1155 E is a clear, linear block copolymer based on styrene and butadiene with bound styrene of 40% mass.

A suitable source of propoxylated bisphenol A fumarate polyester is FILCO 663 P, other sources include those available under the tradenames ATLAC 382 and DION 382E.

FIGS. 1 to 6 show the tensile strengths observed for various compositions on the various substrates. The substrates shown are abbreviated as follows: Perspex (poly methyl methacrylate; "PX"); mild steel ("MS"); stainless steel ("SS"); aluminium ("Al"); grit blasted mild steel ("GBMS"); polyvinyl chloride ("PVC"); poly carbonate ("PC"); nylon 6'6 ("Ny"); and acrylonitrile butadiene styrene ("ABS").

Figure 1:
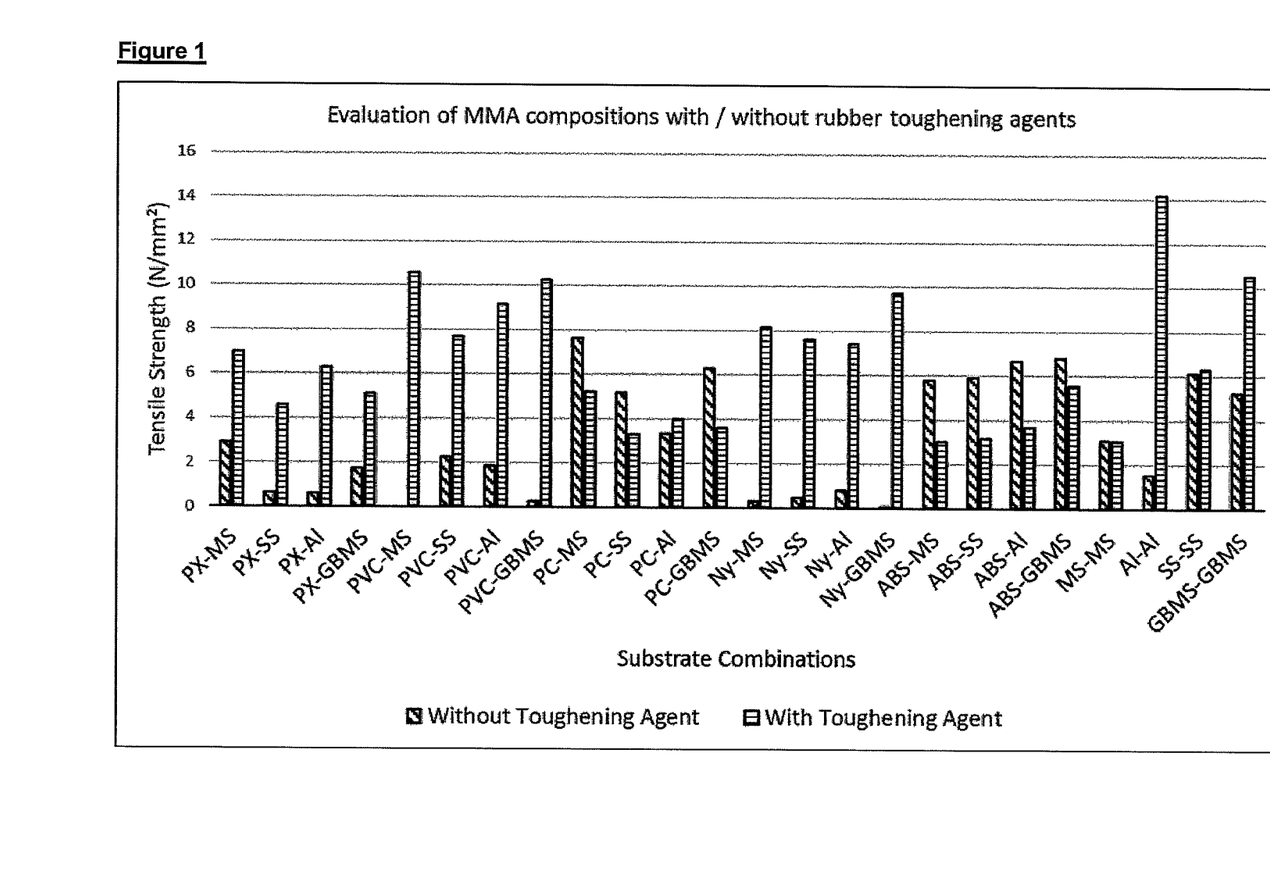
FIG. 1: Evaluation of the tensile strength performance on various substrates of (meth)acrylate compositions with and without rubber toughening agent. The rubber toughening agent is a combination of a styrene butadiene block copolymer and methacrylate functionalized polybutadiene.

FIG. 1 shows the tensile strength performance of composition A on various passive substrates. The presence of styrene butadiene block copolymer and methacrylate functionalized polybutadiene, (specifically, methacrylate (vinyl) terminated butadiene polymer) resulted in a significant increase in tensile strength performance.

Example 2 (Comparative)

The tensile strength performance of methyl methacrylate (MMA) compositions comprising varying levels of styrene butadiene block copolymer on lapshear substrates was assessed. Compositions comprising 10 wt % and 20 wt % styrene butadiene block copolymer were prepared as outlined below.

| Material | Composition/Amt (% wt) | |
|---|---|---|
| | C | D |
| Methyl Methacrylate | 74.60 | 64.60 |
| Styrene Butadiene Block Copolymer (Kraton D1155E) | 10.00 | 20.00 |
| Naphthoquinone 5 wt % in PEGMA | 0.20 | 0.20 |
| EDTA 3.5 wt % in PEG | 0.90 | 0.90 |
| Methacrylic Acid | 10.00 | 10.00 |
| 1-Acetyl-2-Phenylhydrazine | 0.80 | 0.80 |
| Saccharin | 1.70 | 1.70 |
| Cumene Hydroperoxide | 1.90 | 1.90 |

Figure 2:
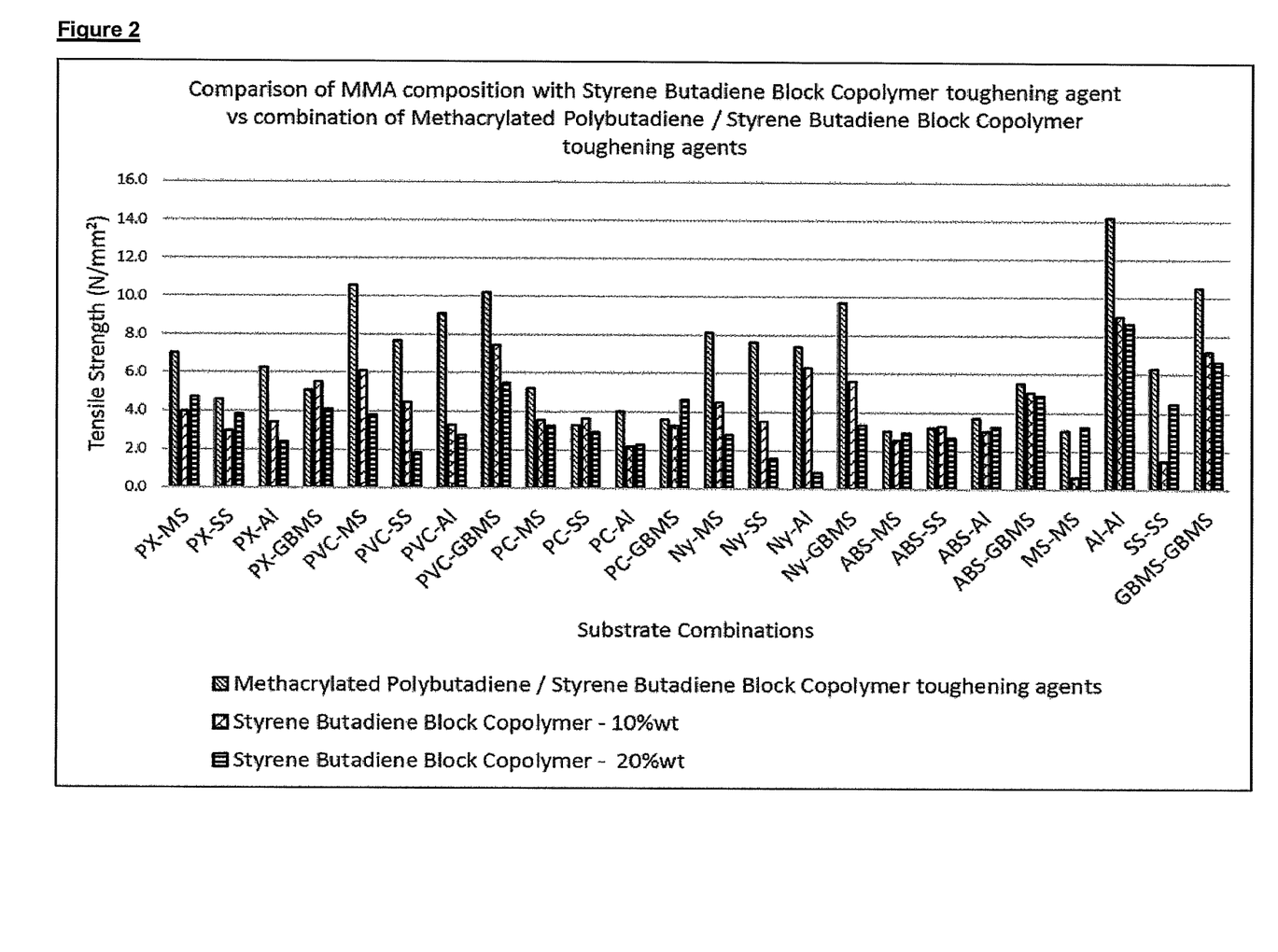
FIG. 2: Evaluation of the tensile strength performance of (meth)acrylate compositions comprising a rubber toughening agent comprising a combination of a styrene butadiene block copolymer and methacrylate functionalized polybutadiene versus (meth)acrylate compositions comprising varying levels of styrene butadiene block copolymer on various passive substrates.

FIG. 2 shows the tensile strength performance of composition A versus compositions C and D on various passive substrates. While the inclusion of styrene butadiene block copolymer improved tensile strength performance for several substrates, the combination of styrene butadiene block copolymer and methacrylate functionalized polybutadiene resulted in enhanced tensile strength performance.

Example 3 (Comparative)

The tensile strength performance of MMA compositions comprising varying levels of methacrylate functionalized polybutadiene on lapshear substrates was assessed. Compositions comprising 10 wt % and 20 wt % methacrylate functionalised polybutadiene were prepared as outlined below.

| Material | Composition/Amt (% wt) | |
|---|---|---|
| | E | F |
| Methyl Methacrylate | 74.54 | 64.54 |
| Methacrylate functionalised polybutadiene (HYPRO 2000X168LC) | 10.00 | 20.00 |
| Naphthoquinone 5 wt % in PEGMA | 0.21 | 0.21 |
| EDTA 3.5 wt % in PEG | 0.93 | 0.93 |
| Methacrylic Acid | 10.00 | 10.00 |
| 1-Acetyl-2-Phenylhydrazine | 0.77 | 0.77 |
| Saccharin | 1.70 | 1.70 |
| Cumene Hydroperoxide | 1.85 | 1.85 |

Figure 3:
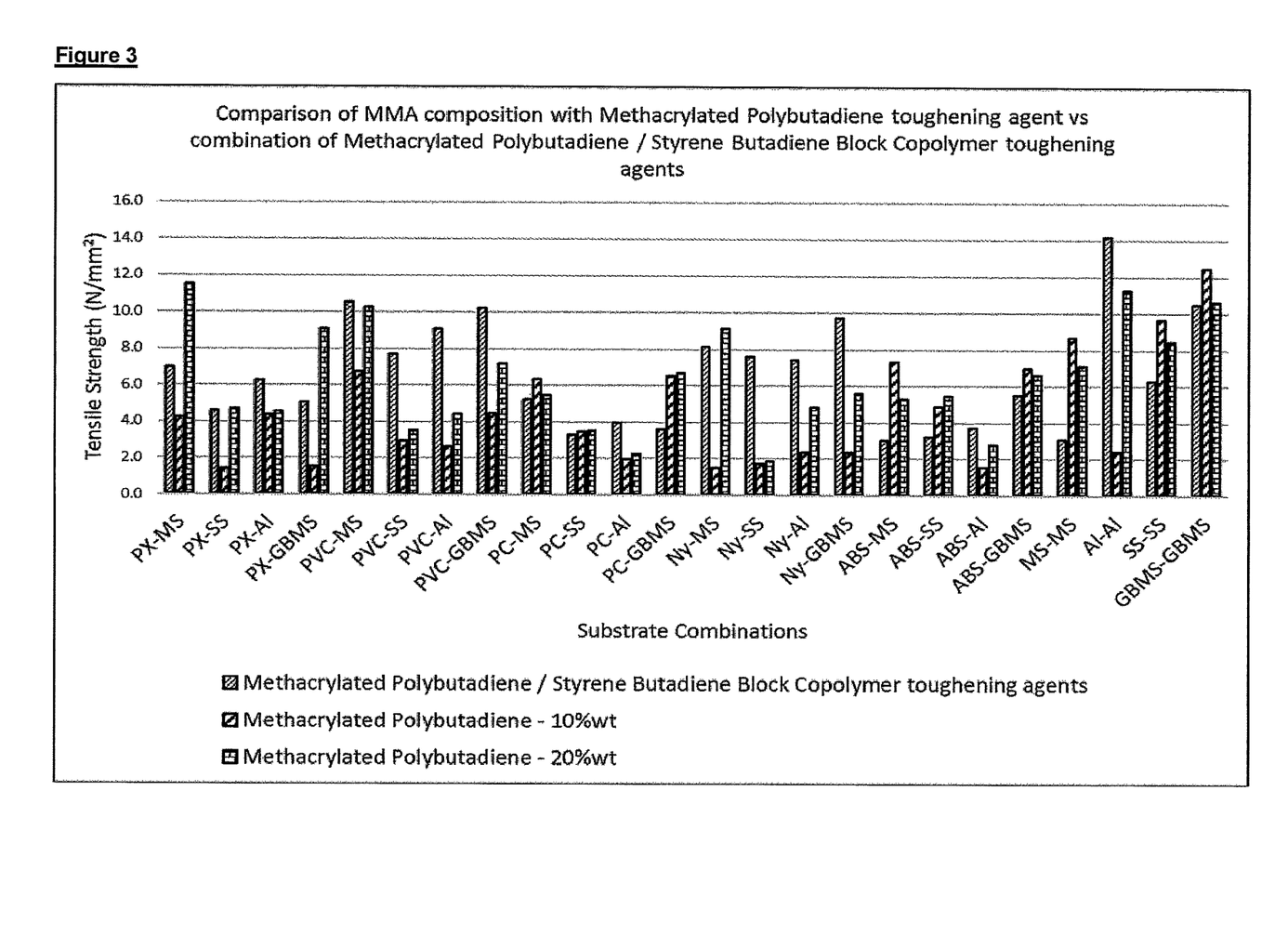
FIG. 3: Evaluation of the tensile strength performance of (meth)acrylate compositions comprising a rubber toughening agent comprising a combination of a styrene butadiene block copolymer and methacrylate functionalized polybutadiene versus (meth)acrylate compositions comprising varying levels of methacrylate functionalized polybutadiene on various passive substrates.
Figure 4:
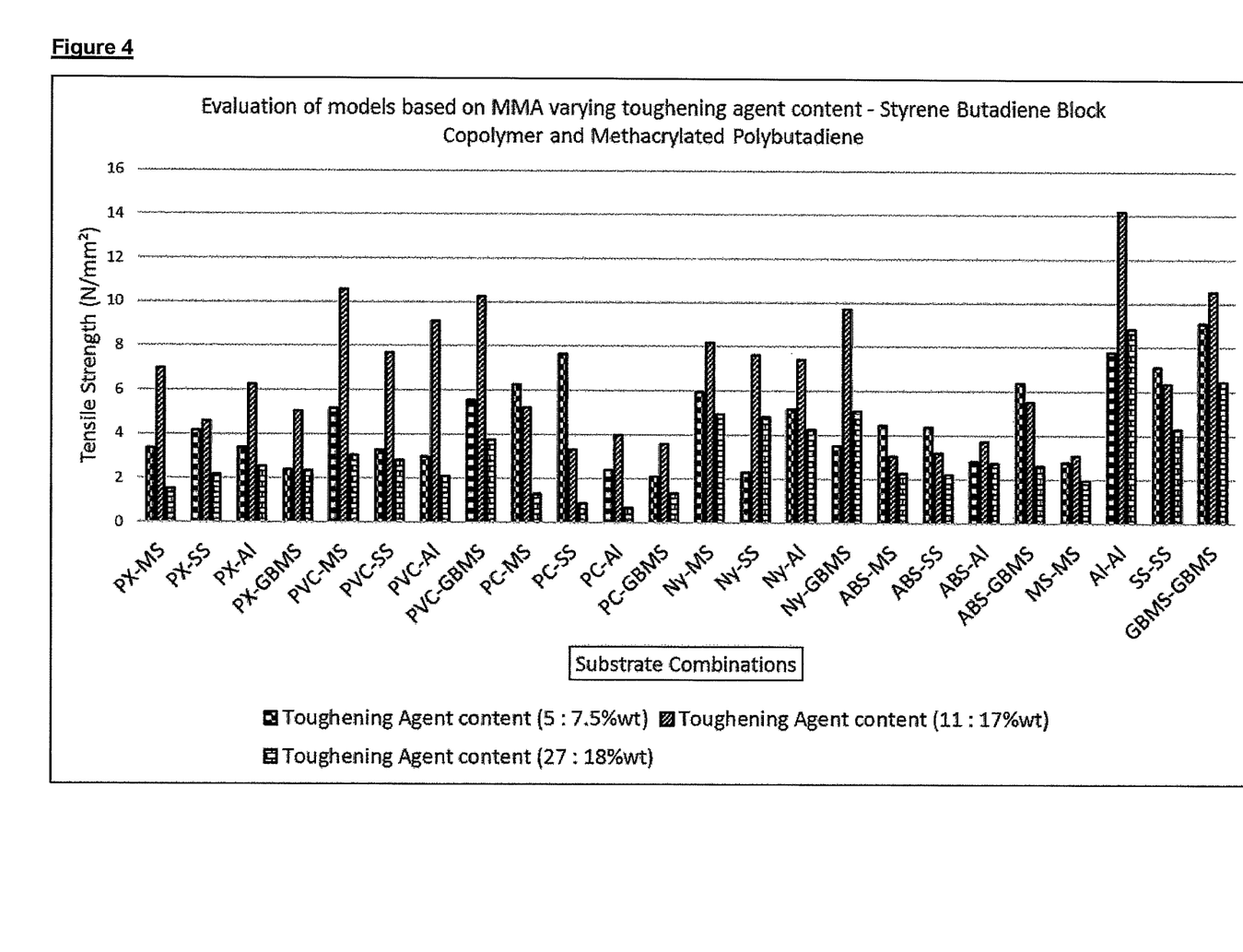
FIG. 4: Evaluation of the tensile strength performance of (meth)acrylate compositions comprising a rubber toughening agent comprising a combination of a styrene butadiene block copolymer and methacrylate functionalized polybutadiene on various substrates wherein the ratio of the styrene butadiene block copolymer and the methacrylate functionalized polybutadiene is varied by weight.

FIG. 3 shows the tensile strength performance of composition A versus compositions E and F on various passive substrates. While the inclusion of methacrylate functionalized polybutadiene improved tensile strength performance for several substrates, the combination of styrene butadiene block copolymer and methacrylate functionalized polybutadiene resulted in enhanced tensile strength performance for certain substrates.

Example 4

Comparison of Lapshear Strength with Variations in Rubber Content

| Material | Composition/Amt (% wt) | | |
|---|---|---|---|
| | G | H | I |
| Methyl methacrylate (MMA) | 72.04 | 56.73 | 46.90 |
| Methacrylate functionalised polybutadiene (HYPRO 2000X168LC) | 5.00 | 11.12 | 27.00 |
| Styrene butadiene block copolymer (KRATON D1155E) | 7.50 | 16.69 | 18.00 |
| Naphthoquinone 5 wt % in PEGMA | 0.21 | 0.21 | 0.20 |
| EDTA 3.5 wt % in PEG | 0.93 | 0.93 | 0.99 |
| Methacrylic acid | 10.00 | 10.00 | 4.16 |
| 1-acetyl-2-phenylhydrazine | 0.77 | 0.77 | 0.75 |
| Saccharin | 1.70 | 1.70 | 1.00 |
| Cumene hydroperoxide | 1.85 | 1.85 | 1.00 |

In Example 4, the ratio of methacrylate functionalized polybutadiene to styrene butadiene block copolymer was varied. Composition H wherein the ratio of methacrylate functionalized polybutadiene to styrene butadiene block copolymer is approximately 11:17 proved to be optimal. Accordingly, compositions wherein the ratio of methacrylate functionalized polybutadiene to styrene butadiene block copolymer is about 2:3 proved particularly advantageous. The tensile strength performance of compositions G, H and I on lapshear substrates was assessed (see FIG. 4).

Example 5

Performance of MMA Compositions with and without Propoxylated Bisphenol A Fumarate Polyester

| Material | Composition/Amt (wt %) | |
|---|---|---|
| | J | K |
| Methyl methacrylate (MMA) | 84.50 | 55.60 |
| Methacrylate functionalised polybutadiene | — | — |

-continued

| Material | Composition/Amt (wt %) | |
|---|---|---|
| | J | K |
| Styrene butadiene block copolymer | — | — |
| Naphthoquinone 5 wt % in PEGMA | 0.20 | 0.20 |
| EDTA 3.5 wt % in PEG | 0.90 | 0.90 |
| Methacrylic acid | 10.0 | 10.00 |
| 1-acetyl-2-phenylhydrazine | 0.80 | 0.80 |
| Saccharin | 1.70 | 1.70 |
| Propoxylated bisphenol A fumarate polyester (FILCO 663 P) | — | 28.90 |
| Cumene hydroperoxide | 1.90 | 1.90 |

Figure 5:
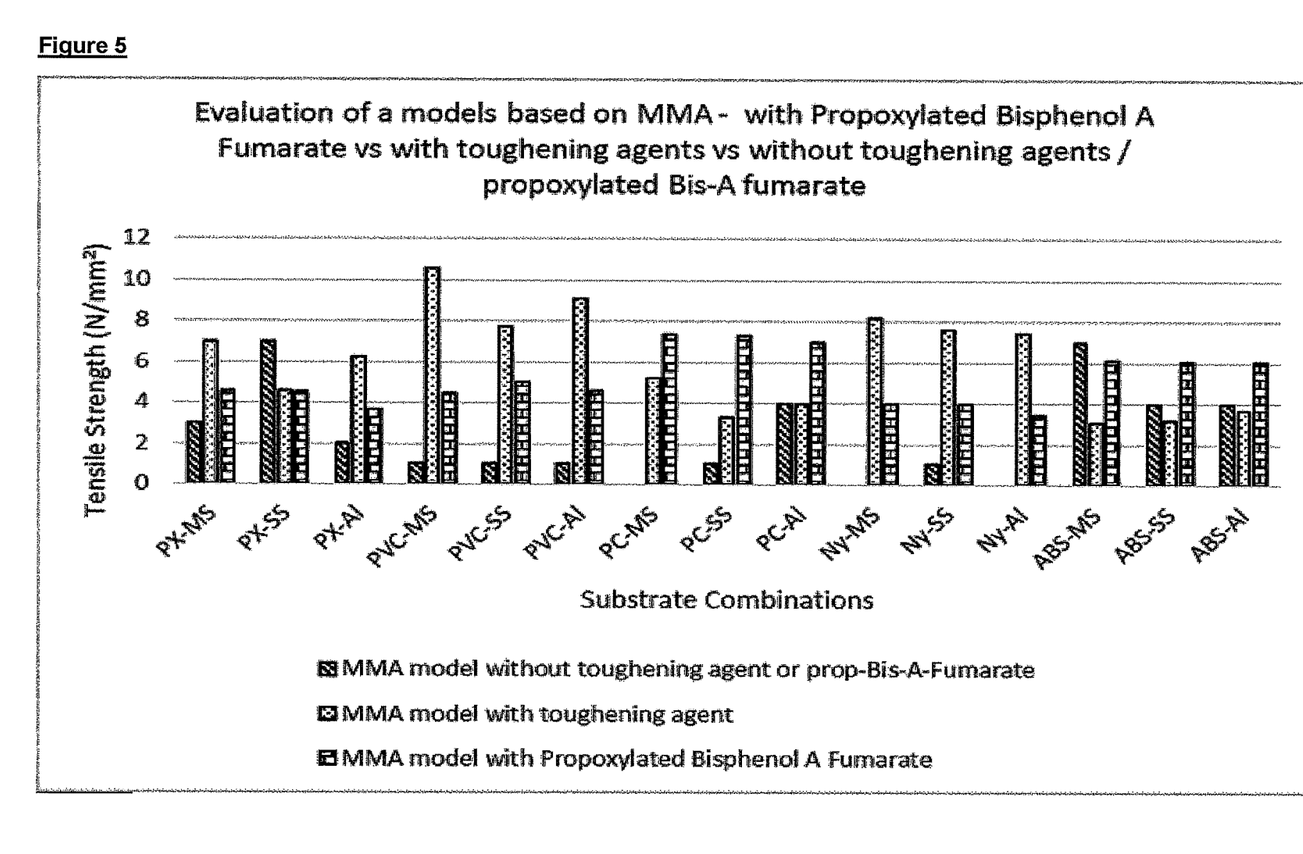
FIG. 5: Evaluation of the tensile strength performance on various substrates of (meth)acrylate compositions with propoxylated bisphenol A fumarate polyester toughening agent, (meth)acrylate compositions comprising a combination of a styrene butadiene block copolymer and methacrylate functionalized polybutadiene, and (meth)acrylate compositions without a toughening agent.

FIG. 5 shows the tensile strength performances of composition A and composition K versus that of composition J on various substrates. Composition A which comprises styrene butadiene block copolymer and methacrylate functionalized polybutadiene resulted in enhanced tensile strength performance in comparison to composition J. Composition K which comprises propoxylated bisphenol A fumarate polyester also resulted in enhanced tensile strength performance when compared to composition J which does not comprise a toughening agent.

Figure 6:
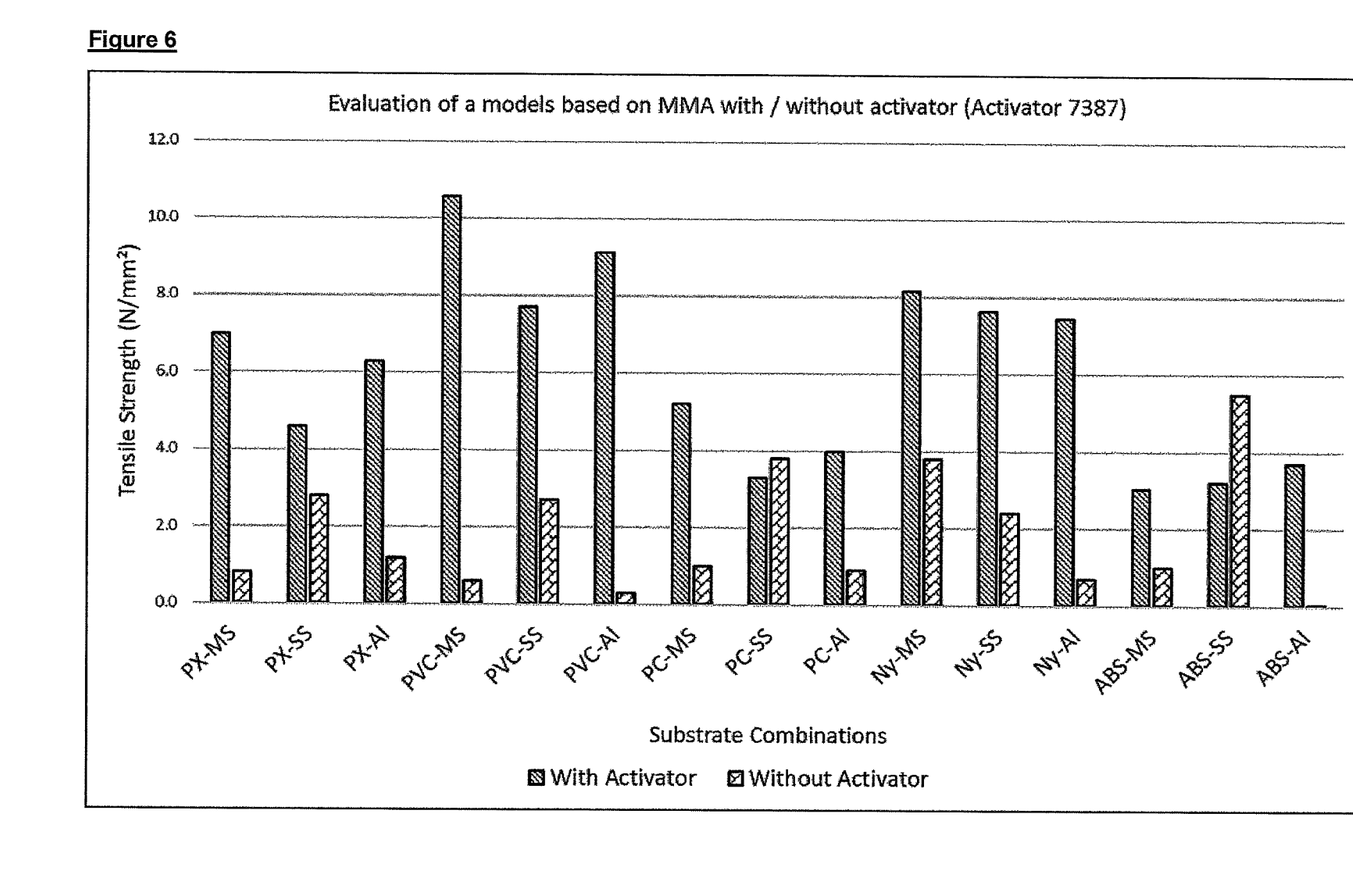
FIG. 6: Evaluation of the tensile strength performance on various substrates of (meth)acrylate compositions with and without the application of an activator.

FIG. 6 shows the tensile strength performance of composition A with and without the use of an activator.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. An anaerobically curable composition comprising:
   (a) at least one (meth)acrylate component;
   (b) an anaerobic cure inducing component; and
   (c) a toughening agent selected from the group consisting of: (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment and wherein the toughening agent is a combination of a styrene butadiene block copolymer and methacrylate functionalised polybutadiene and the methacrylate functionalised polybutadiene is present in an amount of about 5 to about 20 wt %.

2. An anaerobically curable composition according to claim 1, wherein the methacrylate component is a (meth)acrylate monomer having the formula: $H_2C=CGCO2R^1$, wherein G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, polyurethane, carbonate, amine, amide, sulfur, sulfonate, and sulfone.

3. An anaerobically curable composition according to claim 1, wherein the toughening agent is a combination of a styrene butadiene block copolymer and methacrylate functionalised polybutadiene and the styrene butadiene block copolymer is present in an amount of about 5 to about 30 wt %.

4. An anaerobically curable composition according to claim 1, wherein the toughening agent is a combination of a styrene butadiene block copolymer and methacrylate functionalised polybutadiene, and wherein the weight ratio of the methacrylate functionalised polybutadiene to the styrene butadiene block copolymer is from 1:5 to 5:1.

5. An anaerobically curable composition according to claim 1, wherein the toughening agent is a combination of a styrene butadiene block copolymer and methacrylate functionalised polybutadiene, and wherein the methacrylate functionalised polybutadiene is selected from the group consisting of methacrylate (vinyl) terminated polybutadiene and butadiene-acrylonitrile polymer.

6. An anaerobically curable composition according to claim 5, wherein the methacrylate functionalised polybutadiene is methacrylate (vinyl) terminated polybutadiene.

7. An anaerobically curable composition according to claim 5, wherein the methacrylate functionalised polybutadiene is butadiene-acrylonitrile polymer.

8. An anaerobically curable composition according to claim 5, wherein the methacrylate functionalised polybutadiene has a number average molecular weight of from about 3,000 to about 5,500.

9. An anaerobically curable composition according to claim 8 wherein the methacrylate functionalised polybutadiene has a number average molecular weight of about 4,500.

10. An anaerobically curable composition according to claim 8 wherein the methacrylate functionalised polybutadiene has a number average molecular weight of from about 3500 to about 4,000.

11. An anaerobically curable composition according to claim 1, for bonding a first substrate to a second substrate.

12. An anaerobically curable composition according to claim 11, wherein the first substrate is a passive substrate.

13. An anaerobically curable composition according to claim 12, wherein the passive substrate is a plastic.

14. An anaerobically curable composition according to claim 13, wherein the plastic substrate is selected from the group consisting of acrylonitrile butadiene styrene, polycarbonate, polycarbonate/acrylonitrile butadiene styrene, polyarylamides, polyamides, acrylic plastic, polyvinyl chloride, nylon 6'6, and polymethyl methacrylate.

15. An anaerobically curable composition according to claim 11, wherein the second substrate is metallic.

16. An anaerobically curable composition according to claim 15, wherein the second substrate is selected from the group consisting of steel, including mild steel and stainless steel, brass including clock brass, bronze, or zinc, aluminium, iron, copper, beryllium, cobalt, manganese, nickel, cadmium, gold, silver or alloys thereof.

17. A method of bonding together two substrates comprising the steps of:
    applying a (meth)acrylate composition according to claim 1, to at least one of the substrates and mating together the substrates for a time sufficient to permit an adhesive bond to form from the (meth)acrylate composition between the mated substrates.

18. An assembly comprising two substrates bonded together by the cure product of composition according to claim 1.

19. An anaerobically curable composition comprising:
(a) at least one (meth)acrylate component;
(b) an anaerobic cure inducing component; and
(c) a toughening agent selected from the group consisting of (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment, and wherein the toughening agent comprises styrene butadiene block copolymer and wherein polystyrene represents about 35 wt % to about 45 wt % of the overall weight of the block copolymer.

20. An anaerobically curable composition, comprising:
(a) at least one (meth)acrylate component;
(b) an anaerobic cure inducing component; and
(c) a toughening agent selected from the group consisting of (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment, and wherein the toughening agent comprises propoxylated bisphenol A fumarate polyester present in an amount of about 15 to about 45 wt %.

21. An anaerobically curable composition comprising:
(a) at least one (meth)acrylate component;
(b) an anaerobic cure inducing component; and
(c) a toughening agent selected from the group consisting of (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment, and wherein the toughening agent comprises propoxylated bisphenol A fumarate polyester having a number average molecular weight of from about 2,500 to about 3,000.

22. An anaerobically curable composition, comprising:
(a) at least one (meth)acrylate component;
(b) an anaerobic cure inducing component; and
(c) a toughening agent selected from the group consisting of (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment, and further comprising a transition metal.

23. An anaerobically curable composition according to claim 22 wherein the transition metal is selected from copper, iron, vanadium, cobalt, chromium, silver and manganese, or combinations thereof.

24. An anaerobically curable composition according to claim 22 wherein the transition metal is in salt form and is selected from the group consisting of: cobalt (II) naphthenate, copper carbonate, copper (II) acetylacetonate, silver nitrate, vanadium nitrate, vanadium (Ill) acetylacetonate and combinations thereof.

25. A process for preparing a reaction product from a curable composition, comprising the steps of:
applying an activator composition to a desired substrate surface;
applying to that surface an anaerobically curable one-part composition comprising:
(a) a (meth)acrylate component;
(b) a cure inducing component; and
(c) a toughening agent selected from the group consisting of: (i) a combination of a styrene butadiene block copolymer and methacrylate functionalised polybutadiene; and, (ii) a combination of a styrene butadiene block copolymer, methacrylate functionalised polybutadiene and propoxylated bisphenol A fumarate polyester;
mating a second surface to that substrate surface to form an assembly; and
exposing the (meth)acrylate composition to an anaerobic environment for a time sufficient to cure the composition;
wherein the composition will not cure until exposed to an anaerobic environment.

26. An anaerobically curable composition, comprising:
(a) at least one (meth)acrylate component;
(b) an anaerobic cure inducing component; and
(c) a toughening agent selected from the group consisting of (i) a combination of a styrene butadiene block copolymer and methacrylate functionalised polybutadiene; and (ii) a combination of a styrene butadiene block copolymer, methacrylate functionalised polybutadiene and propoxylated bisphenol A fumarate polyester; wherein the composition will not cure until exposed to an anaerobic environment, wherein the toughening agent is a combination of a styrene butadiene block copolymer and methacrylate functionalised polybutadiene, and wherein the weight ratio of the methacrylate functionalised polybutadiene to the styrene butadiene block copolymer is about 2:3.

27. A method of anaerobically curing a (meth)acrylate composition, comprising the steps of:
providing a one-part (meth)acrylate composition comprising:
(a) a (meth)acrylate component;
(b) a cure inducing component; and
(c) a toughening agent selected from the group consisting of (i) a combination of a styrene butadiene block copolymer and methacrylate functionalised polybutadiene; and, (ii) a combination of a styrene butadiene block copolymer, methacrylate functionalised polybutadiene and propoxylated bisphenol A fumarate polyester; and
exposing the (meth)acrylate composition to an anaerobic environment for a time sufficient to cure the composition;
wherein the composition will not cure until exposed to an anaerobic environment, wherein the toughening agent is a combination of a styrene butadiene block copolymer and methacrylate functionalised polybutadiene, and wherein the weight ratio of the methacrylate functionalised polybutadiene to the styrene butadiene block copolymer is about 2:3.

28. A process according to claim 25, wherein the toughening agent is a combination of a styrene butadiene block copolymer and methacrylate functionalised polybutadiene wherein the weight ratio of the methacrylate functionalised polybutadiene to the styrene butadiene block copolymer is about 2:3.

* * * * *